United States Patent [19]

Gavin, Jr. et al.

[11] Patent Number: 4,678,376

[45] Date of Patent: Jul. 7, 1987

[54] METHOD OF CONSTRUCTING MEANS FOR DIRECTING OR HOLDING WATER

[75] Inventors: John D. Gavin, Jr.; Michael D. Meddaugh, both of Midland, Mich.

[73] Assignee: Dow Corning Corporation, Midland, Mich.

[21] Appl. No.: 288,254

[22] Filed: Jul. 30, 1981

[51] Int. Cl.$^4$ .............................................. E02B 5/02
[52] U.S. Cl. ...................... 405/270; 52/258; 52/128; 428/266
[58] Field of Search ............ 405/270, 118, 52, 53, 405/128, 129, 258; 428/266; 528/18–23

[56] References Cited

U.S. PATENT DOCUMENTS

| | | | |
|---|---|---|---|
| 2,170,671 | 8/1939 | Adler | 405/118 |
| 2,961,799 | 11/1960 | Coe . | |
| 3,174,942 | 3/1965 | Erikson et al. | 260/27 |
| 3,189,576 | 6/1965 | Sweet | 528/22 X |
| 3,294,725 | 12/1966 | Findlay et al. | 528/23 X |
| 3,334,067 | 8/1967 | Weyenberg | 528/17 |
| 3,485,661 | 12/1969 | Campbell et al. | 428/266 |
| 3,555,828 | 1/1971 | Goldstein et al. | 405/264 |
| 3,763,072 | 10/1973 | Krieger | 405/270 X |
| 3,949,113 | 4/1976 | Draper et al. | 405/270 X |
| 4,207,017 | 6/1980 | Jarrel | 405/270 |
| 4,221,688 | 9/1980 | Johnson et al. | 528/18 X |
| 4,293,440 | 10/1981 | Elphingstone et al. | 405/270 X |

OTHER PUBLICATIONS

"Proceedings of the Water Harvesting Symposium Phoenix, Arizona, Mar. 26–28, 1974," Agricultural Research Service.
USPA, GPO791–043; Michelson, pp. 93–102; McBride & Shiflet, pp. 115–121; Dedrick, pp. 175–191; Plueddelmann, pp. 76–83.

Primary Examiner—Dennis L. Taylor
Attorney, Agent, or Firm—Edward C. Elliott

[57] ABSTRACT

An economical method of constructing a means suitable for directing, transporting, or holding water based upon the use of an aqueous liquid silicone elastomeric emulsion to form a membrane on a depression surface which is suitable to direct, transport or hold water. The emulsion, which cures under atmospheric conditions, is sprayed on the depression surface, then dried. The construction is useful as a water harvesting structure with a long, useful life. Such structures are particularly useful in providing water for animals in arid regions.

8 Claims, 5 Drawing Figures

METHOD OF CONSTRUCTING MEANS FOR DIRECTING OR HOLDING WATER

BACKGROUND OF THE INVENTION

1. Field of the Invention

This invention relates to a method of on-site construction of a silicone elastomeric membrane upon the surface of a depression suitable to direct, transport or hold water. The coated surface prevents loss of water into the earth while directing the water to a predetermined destination or holding the water in place.

2. Description of the Prior Art

Water harvesting is a technique for developing local water supplies for such things as livestock, wildlife, runoff farming, and domestic use. Ancient desert farmers cleared hillsides and smoothed the soil to increase the amount of rain water that flowed down the hill. Contour ditches carried the runoff to lower lying fields where the water was used to irrigate crops.

In more recent history, the collection of rainwater from the roofs of homes and its storage in a cistern was common practice until the widespread development of central water systems in cities.

Systems have been evaluated for collecting water supplies for livestock in semiarid rangeland. Mikelson has reported on the use of metal sheeting, butyl rubber sheeting, asphalt roofing, and soil-bentonite mixtures as methods of collecting water for transportation to storage areas. Mikelson's report in "Proceedings of the Water Harvesting Symposium, Phoenix, Ariz., Mar. 26–28, 1974," published by the Agricultural Research Service, U.S. Department of Agriculture, indexed as GPO791-043, pages 93 to 102, concludes that water harvesting catchments tested can be useful, but the costs are high. The effects of weathering reduces the useful life of all methods. High winds and sunlight tend to destroy the covering materials. McBride and Shiflet report in the same reference, pages 115 to 121, on water harvesting catchments of various types, including glass fiber-asphalt constructions. Those glass fiber-asphalt constructions coated the soil, after sterilization, with glass fiber mat which was then coated with cationic liquid asphalt emulsion and overcoated with roofing type clay asphalt emulsion. The emulsion requires replacement at 3 to 5 year intervals. The surface was often broken by plants, burrowing rodents and ants. Dedrick reports in the same reference on storage systems at pages 175 to 191. In addition to methods mentioned above, he discusses the use of plastic film, ethylene-propylene rubber and chlorosulfonated polyethylene sheeting, and hard surface linings such as portland cement concrete. The rubber coatings must be protected from mechanical damage and weathering. The hard surface linings are expensive to install and subject to damage from alternating freezing and thawing.

In the same reference, at pages 76 to 83, Plueddemann reports on testing, under laboratory conditions, a variety of latex polymers and water repellants for suitability for treatment of soil to improving water harvesting. His recommendation is a mixture of an SBR latex mixed with an emulsion of silicone fluid. Experiments are given to show usefulness, but all work was in a laboratory as experiments. In his conclusion, he states that the silicone emulsion alone is completely ineffective, but is a very effective water repellent when mixed with a suitable polymer latex.

A companion technique for the development of local water supplies is the use of canals or ducts to transport water from an available source to the desired predetermined location. The source, of course, must be located high enough above the predetermined location so that the water will flow with sufficient velocity to deliver the required amounts. Canals, aquaducts, and irrigation ditches have varied in construction from earthen ditches to concrete lined ditches and masonry aquaducts. Lining ditches with concrete is difficult and expensive, so it has been primarily confined to large canals. In small ditches or ducts as used in irrigation systems, the cost of concrete linings is prohibitive.

An earthen ditch such as used in irrigation systems can waste a majority of the water that enters the system. Water soaks into the walls and bottom of the ditch all along its length. Wet soil along the ditch readily grows vegetation which further uses additional water through transpiration. Vegetation growing under the water surface further retards the flow of water through the ditch, exposing the water to further losses through evaporation. Water lost during transporting from source to the use location is wasted. In arid locations, such waste may be of great importance due to the lack of sufficient water at the source to make up for the loss in transporting.

SUMMARY OF THE INVENTION

An economical method suitable for directing or holding water is described. The method yields a water impervious covering upon an appropriate earth surface, such as a catchment or irrigation ditch, that is easily constructed in place. The method comprises treating the surface of a depression suitable to direct, transport, or hold water to make the surface receptive to a following coat of sprayed aqueous liquid silicone elastomeric emulsion. The emulsion cures at atmospheric conditions to a membrane which is impervious to liquid water. The membrane can be reinforced with chopped fibers during the spraying step. The membrane can consist of one or more layers. The lined depression has a long, useful life due to the resistance of the cured silicone elastomeric membrane to aging and weathering.

DESCRIPTION OF THE INVENTION

This invention relates to a method of constructing a means suitable for directing, transporting, or holding water comprising (A) treating surface soil of an earthen depression which is suitable to direct, transport, or hold water, to make the surface soil suitable for receiving a coating consisting essentially of an aqueous liquid silicone elastomeric emulsion curable at atmospheric conditions, thereafter (B) spraying the surface of the depression with an aqueous liquid silicone elastomeric emulsion curable at atmospheric conditions, and (C) allowing the silicone elastomeric emulsion to cure to a membrane impervious to liquid water.

The aqueous liquid silicone elastomeric emulsion can be combined with chopped fibers to give a reinforced membrane.

Following the method of this invention yields a membrane, in contact with an appropriate earth surface, that has been constructed in place.

The means suitable for directing or holding water comprises a depression which has been coated with a liquid silicone elastomeric emulsion curable at atmospheric conditions. Upon curing, the emulsion yields a membrane which provides a coating which is impervious to liquid water. The membrane prevents water flowing through the depression from eroding the walls of the depression or from being lost by soaking into the soil.

The method of this invention concerns means for economically collecting, transporting, and holding water by moving water by means of gravity flow over or through lined depressions, such as catchments, transporting ducts, and holding ponds. The method is adaptable to construction using ordinary tools and unskilled labor so that the method is economical. The method is adaptable to both large and small constructions in areas that are easily accessible or in remote locations that are difficult to reach, such as isolated mountainous regions.

Figure 1:
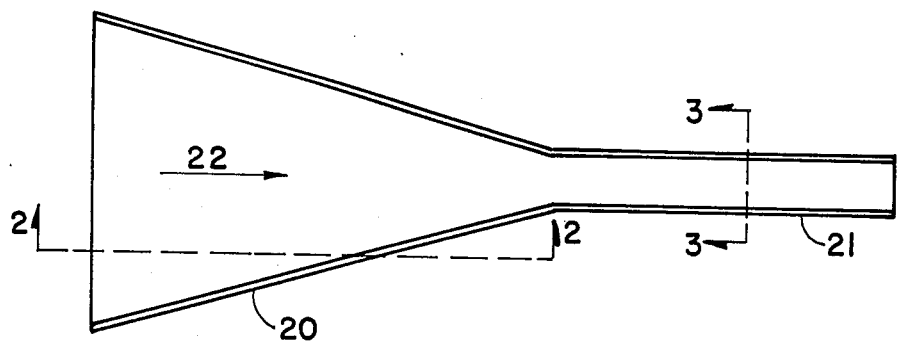
FIG. 1 is a top view of a catchment 20 and a transporting duct 21.

To further explain the invention, a construction comprising a catchment 20 and transporting duct 21 will be discussed as illustrated in FIG. 1 as examples of a depression suitable to direct and transport water. The direction of water flow is shown as 22.

The area of the catchment is determined by the area of suitable land available, as well as the area necessary to collect the required amount of water. The more water required, the larger the area required. The lower the amount of expected precipitation, the larger the area required. The area should have a gradual slope so that the water flows down the catchment area and through the transporting duct to a predetermined destination. The predetermined destination can be a storage tank or pond to store the water, or it can be an irrigation system to distribute the water to crops.

Figure 2:
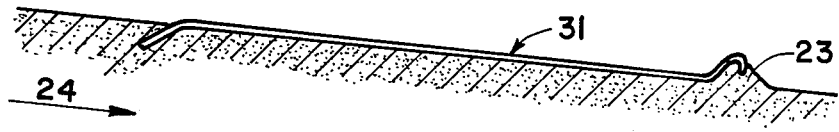
FIG. 2 is a cross section of a catchment 20 along lines 2—2 in FIG. 1.

FIG. 2 is a cross section of the catchment along line 2—2 in FIG. 1. A dike 23 is built up of earth to aid in directing the water flow to the transporting duct. The dike is built up to a height sufficient to contain the maximum amount of water expected to be present at any one time. In snowfall areas, the dike will also tend to trap snow which could otherwise blow away before melting. The membrane 31 is present, in areas of porous soil, to prevent the water collected by the catchment from soaking into the earth, rather than flowing down to and through the transporting duct. The membrane also aids in preventing the destruction of the catchment and transporting duct due to long term weathering and due to the effects of plants growing in the area.

In an area that consists primarily of impervious soil or rock, the suitable catchment can consist essentially of a dike or dikes arranged at the lower end of the catchment area to direct water flowing down over the surface of the catchment area to the transporting duct.

The upper edge of the membrane is shown buried in the soil to stabilize it. Water flowing down the slope flows over the buried membrane edge onto the membrane surface and is directed by the dikes into the transporting duct. The membrane lining the catchment area, dikes, and transporting duct prevents loss of water by soaking into the ground and also prevents erosion of the catchment and transporting duct due to the flowing water.

Figure 3:
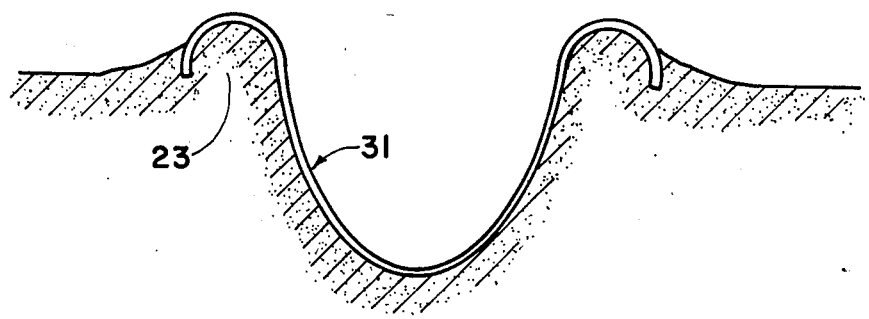
FIG. 3 is a cross section of a transporting duct along line 3—3 in FIG. 1.

FIG. 3 is a cross section of a transporting duct 21 along line 3—3 in FIG. 1. The duct is constructed of such a size that it is capable of containing the flow of water from the catchment or other source. The dike 23 on the edge of the duct prevents surface water from flowing under the membrane 31 which lines the surface of the duct. The membrane is used here for the same purposes as in the catchment. The membrane is constructed by spraying the treated surface of the catchment and transport duct with an elastomeric silicone emulsion which cures under ambient conditions to a membrane impervious to liquid water.

Prior to the first step in the method of this invention, one can select and arrange a suitable depression, such as a catchment and transporting duct, on a terrain such that the catchment will be suitable for collecting water and the duct will be suitable for transporting water to a predetermined location. Because this method envisions moving the water by gravity flow, the catchment and duct must be at a higher elevation than that of the predetermined location which is normally a storage tank or pond. The catchment area is cleared of all vegetation and the surface of the area is smoothed. If the surface left by the clearing step is composed of large rocks, for instance, the space between the rocks should be filled with sand, clay, or soil. The finished surface should be smooth, without projections and without depressions such as spaces between rocks or holes left from the removal of rocks or vegetation. It is preferred that the surface consist of a smooth layer of fine sand or soil so that the membrane to be formed over the surface maximizes water flow and minimizes hold up of water.

If the surface of the catchment area is impervious soil or rock, it is not necessary to completely cover the area with a smooth layer of fine sand or soil as discussed above. The surface of the area would not need to be completely covered with the membrane since the surface would already be suitable for collecting water. The only preparation that would be necessary would be the construction of the dikes at the lower end of the catchment area to direct the water to the transporting duct.

The outer edges of the membrane need to be stabilized to hold them in place so that they are not lifted up by wind or flowing water. Because the location and shape of the edges is determined in part by the shaping of the depression, this must be a consideration during the preparation of the depression.

If the catchment, for instance, is located on a sloping rock surface and only dikes are constructed at the lower end, the upper edge of the membrane could be adhered directly to the rock surface by spraying the elastomeric silicone emulsion onto the clean rock. The sprayed coating would then extend over the face of the dike 23 and down over the back side, as shown in FIG. 3. After the emulsion is cured, the edge on the dike could be stabilized by burying it by placing dirt over it at the back of the dike. The edge is then held in place with no danger of wind being able to dislodge it.

At a location such as the upper edge of the membrane 31 shown in FIG. 2, the preparation of the depression would include a ditch dug into the ground at that location. During the spraying step, the elastomeric silicone emulsion is sprayed onto the depression surface and into the ditch over the side next to the depression and down to the bottom of the ditch. After curing of the membrane, the ditch is filled with soil, leaving the membrane edge buried in a position that prevents flowing water from getting under the membrane.

After the surface of the catchment is properly smoothed and any loose soil is compacted, the surface soil is treated to prepare it for receiving the elastomeric silicone emulsion to be sprayed on it. First, the surface is preferably treated to kill any vegetation or seeds remaining so that there will be no plants attempting to grow up through the membrane. Then the surface soil is treated so that it will be wetted by the elastomeric silicone emulsion. In many cases, dry soils are difficult to wet initially. It has been found that the surface soil's ability to wet can be improved by spraying the soil with water until the surface is wetted uniformly. Then, when the silicone emulsion is sprayed on the wet surface, it wets the particles of soil uniformly. Another preferable method is spraying the surface soil with diluted elastomeric silicone emulsion. A silicone emulsion diluted to the point where it contains about 10 to 20 percent by weight solids is sprayed upon the surface soil until the soil becomes wet from the emulsion. The emulsion then soaks into the soil, coating the particles thereof. This coated surface is then easily wet by a subsequent application of silicone emulsion.

The aqueous liquid silicone emulsion used to form the silicone membrane can be any silicone elastomeric emulsion that is curable under ambient conditions. The emulsion must be capable of yielding a coherent film upon curing so that a membrane impervious to liquid water is formed. The type of film left upon drying and curing of the emulsion depends to some extent upon the viscosity and solids content of the emulsion. The solids content is the percent of nonvolatile material remaining in a 2 gram sample of the emulsion that has been heated for 1 hour at 150° C. in an air circulating oven. The sample is in an aluminum foil dish, 60 mm in diameter and 15 mm deep. If the silicone emulsion is of a high viscosity or thixotropic, it will penetrate into the soil less than a low viscosity, which can soak down into the soil an appreciable distance, providing that a sufficient amount of emulsion is applied.

The solids content of the emulsion determines how much of the wet film remains when the emulsion dries. By adjusting the solids content and viscosity of the silicone emulsion, the nature of the membrane produced can be regulated. For instance, when treated soil is sprayed with an emulsion of less than about 25 percent solids and a viscosity of about 10 Pa.s at 25° C., the emulsion soaks down into the soil. After drying, the soil particles will be bonded together by the cured emulsion. The spaces between the particles will not be completely closed as there is insufficient material left by the dried emulsion to cause an impervious film to be formed. The surface will be firm and the particles will be bonded together for some distance down from the surface.

When an emulsion of higher viscosity, such as 100 Pa.s at 25° C., is applied to the soil, the emulsion soaks into the soil a short distance with most of the emulsion remaining on the surface. If this emulsion has a high solids content, as for instance 60 percent solids, the film left upon drying will be impervious to liquid water. Thus it is possible to determine the type of membrane that is produced. A first coat of emulsion can be sprayed upon the soil that has a low viscosity and low solids content which will soak down an appreciable distance and bind the soil particles together. Additional coats of the same emulsion or an emulsion of higher viscosity and solids content can then be applied by spraying, rolling, or brushing to yield an impervious film. In this manner, the surface soil can be covered with a membrane that is bound to a significant portion of the upper layer of soil.

Figure 4:
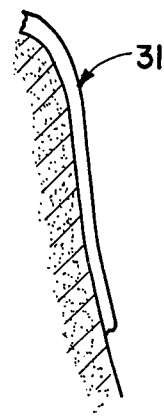
FIGS. 4 and 5 are details of the structure of a membrane formed from an aqueous liquid silicone elastomeric emulsion.

A membrane 31 is represented in FIGS. 2, 3, and 4 in place against the surface soil.

A membrane constructed of cured elastomeric silicone emulsion in the manner described above depends, for the most part, upon the physical strength of the cured emulsion for the physical strength possessed by the membrane because the soil does not add much reinforcement to the membrane. It is possible to reinforce the membrane by including chopped fibers in the membrane to aid in improving the physical properties of the membrane, in particular the tensile strength and tear strength.

Figure 5:
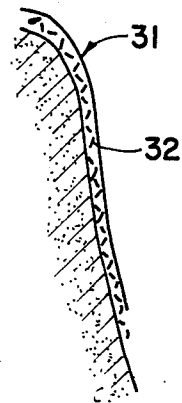

Reinforcing fibers can be any of the common fibers resistant to weathering effects such as glass, polypropylene, nylon, rayon, or acrylate polyester fibers or mixtures of fibers. Fibers chopped to a useful length, such as from 1 mm to 10 mm or longer, can be added to the silicone emulsion; which is then applied to the treated surface soil. A preferred method of obtaining a fiber reinforced membrane is through the use of spraying equipment which simultaneously chops the fiber into the proper length and then propels the chopped fiber into the stream of emulsion being sprayed from a spray gun. The fibers and emulsion are carried together onto the treated surface soil to yield a chopped fiber containing emulsion which then dries into a chopped fiber reinforced membrane. Additional coats, with or without chopped fiber reinforcement, can then be added. Glass fibers are preferred for this type of membrane in an amount of about 5 to 10 percent by volume based on the wet membrane. FIG. 5 is a representation of a membrane 31 in place on an earthen surface, the membrane being reinforced with chopped fibers 32.

Another method of preparing a membrane containing chopped fibers would be the mixing of chopped fibers into the bulk silicone emulsion. The amount of fiber added is determined by the increase in viscosity caused by the fiber addition When the surface soil is first bonded by spraying with silicone emulsion and drying, the fiber reinforced silicone emulsion can then be applied by spraying, rolling, or brushing.

The method of this invention yields a depression lined with a silicone elastomer membrane obtained from a silicone elastomeric emulsion. A means suitable for directing or holding water produced following the method of this invention is unique because of the nature of the membrane. The membrane can be easily produced, in place, using only ordinary installation equipment. The installing method does not produce dangerous or irritating fumes. The installation can be performed without highly skilled and expensive labor. The membrane is particularly useful because it is resistant to the effects of hot and cold temperatures, sunlight, oxidation from the air, and other causes of outdoor weathering.

Many previous methods used to form catchments and transportation ducts are more complicated to construct and more expensive. Methods such as lining with concrete, both with and without metal reinforcement are expensive due to the cost of the concrete and reinforcement and the amount of labor. Such a lining is subject to cracking from temperature changes because it has no elasticity. The same is true of asphalt, but in addition, heavy equipment is required to heat the asphalt and to spread it and compact it in place. Asphalt is subject to cracking from temperature changes and to weathering from the sun and oxygen in the air. Methods using asphalt emulsion suffer due to the inability of the asphalt to withstand temperature changes and weathering effects in the relatively thin coatings produced.

A silicone elastomeric emulsion preferred in this invention comprises (a) 100 parts by weight of an anionically stabilized, hydroxyl endblocked polydiorganosiloxane, present as an oil-in-water emulsion, (b) from 1 to 150 parts by weight of colloidal silica, (c) from 0 to 200 parts by weight of filler other than colloidal silica, and (d) from 0.1 to 2.0 parts by weight of alkyl tin salt, said silicone emulsion having a pH of 9 to 11.5. Such silicone elastomeric emulsions are commercially available.

Silicone elastomeric emulsions such as these are disclosed in U.S. Pat. No. 4,221,688, issued Sept. 9, 1980, to Johnson, Saam, and Schmidt, which is hereby incorporated by reference to describe silicone elastomeric emulsions which are useful for steps (A) and (B) of this invention, and methods of manufacture. Such silicone elastomeric compositions cure by removal of the water from the emulsion.

Hydroxyl endblocked polydiorganosiloxanes useful in the silicone elastomeric emulsions used in this invention are those which can be emulsified and which will impart elastomeric properties to the product obtained after the removal of water. The best physical properties are obtained when the weight average molecular weight of the polymer is above 50,000. The preferred molecular weights are in the range of 200,000 to 700,000. The most preferred hydroxylated polydiorganosiloxanes are those prepared by the method of anionic emulsion polymerization described by Findley et al. in U.S. Pat. No. 3,294,725, issued Dec. 27, 1966, which is hereby incorporated by reference to show the methods of polymerization and to show the hydroxyl endblocked polydiorganosiloxane in emulsion. The anionic surfactants used are preferably the salt of the surface active sulfonic acids used in the emulsion polymerization to form the hydroxyl endblocked polydiorganosiloxanes as shown in U.S. Pat. No. 3,294,725, cited above, which is hereby incorporated by reference to show the surface active sulfonic acids and salts thereof.

Colloidal silica is a required ingredient in the preferred emulsion. The silicone emulsion does not yield a cured film upon drying if the colloidal silica is not present in the composition. Any of the finely divided colloidal silicas that are capable of being dispersed in the silicone emulsion can be used. Preferred are the colloidal silicas available as colloidal silica dispersions in water.

An alkyl tin salt, preferably a dialkyltindicarboxylate, is used to reduce the storage time between the preparation of the silicone emulsion and the time an elastomeric product can be obtained from the silicone emulsion by removal of the water under ambient conditions to an acceptable range of one to three days. Alkyl tin salts can be used in amounts of from 0.1 to 2.0 parts by weight for each 100 parts by weight of the hydroxyl endblocked polydiorganosiloxane, preferably about 0.1 to 1.0 parts by weight. Dialkyltindicarboxylates which are preferred include dibutyltindiacetate, dibutyltindilaurate, and dioctyltindilaurate.

Another useful ingredient for addition to the silicone emulsion is a filler other than colloidal silica. Such fillers can be added to provide pigmentation which can be used, for example, as a colorant or as an ultraviolet light screening agent. Other fillers can be used as extending fillers which can be used to reduce the cost per unit of the elastomeric product. Examples of fillers other than colloidal silica include carbon blacks, titanium dioxide, clays, aluminum oxide, quartz, calcium carbonate, zinc oxide, mica, and various colorant pigments.

A preferred method of preparing the silicone elastomeric emulsion is to emulsion polymerize a hydroxyl endblocked polydiorganosiloxane using an anionic surfactant, add the colloidal silica, and then adjust the pH within the range of 10.5 to 11.5 inclusive. The preferred method of adjusting the pH has been found to be with a basic compound such as an organic amine, an alkali metal hydroxide, or a combination thereof. The preferred organic amine is diethylamine. The preferred alkali metal hydroxide is sodium hydroxide. After adjustment of the pH, the alkyl tin salt is added.

The solids content of the silicone elastomeric emulsion is adjusted in accordance with the embodiments of this invention to be used. Low solids content emulsions, preferably from 10 to 20 percent solids by weight, having a low viscosity, 10 Pa.s for example, are used to bind soil or earth. High solids content emulsions, preferably from 25 to 70 percent solids by weight, having a high viscosity, 30 Pa.s to 100 Pa.s for example, are used to form continuous impervious membranes, either unreinforced or reinforced with chopped fibers.

The method of this invention for constructing a means suitable for directing or holding water is particularly useful in making such structures for agricultural areas which are difficult to get to. If necessary, the required shaping of the water holding area and lining of the area with a membrane of a silicone elastomer can all be done with hand tools so that expensive heavy equipment is not necessary. The silicone elastomer membrane is resistant to the effects of weathering so that the structure will have a long, useful life, further reducing the cost per year. A particular use is collecting water for animals in mountainous terrain.

The following examples are presented for purposes of illustrating the invention and should not be construed as limiting the scope of the invention which is properly delineated in the claims.

EXAMPLE 1

An anionically emulsion polymerized polydimethylsiloxane was prepared by homogenizing 54 parts by weight hydroxyl endblocked polydimethylsiloxane having a viscosity of about 0.075 Pa.s at 23° C., 44 parts by weight of water, and 2.5 parts by weight of a 30 percent solution of sodium lauryl sulphate. After homogenization, the emulsion was catalyzed with 0.6 part by weight of dodecylbenzene sulfonic acid. Polymerization was then allowed to proceed to equilibrium at room temperature. The emulsion had a pH of less than 3 with a solids content of about 55% by weight. The polydimethylsiloxane had a peak molecular weight of about 325,000.

An elastomeric silicone emulsion was prepared by mixing together 15 parts by weight of an aqueous sodium stabilized colloidal silica dispersion having about 15 percent by weight silica and 2 parts by weight of diethylamine, then adding 100 parts by weight of the above polydimethylsiloxane emulsion. The mixture was then catalyzed with 0.5 part of a 50% by weight dioctyltindilaurate emulsion.

About 200 g of the above elastomeric silicone emulsion was sprayed over the surface of a 0.2 by 0.3 meter pan full of ordinary sand. After drying for 2 days, the top 6 to 10 mm of sand was found to be bound together into a firm but flexible layer.

Additional layers coated on the above layer could be used to produce a membrane suitable for lining a catchment and transporting duct.

EXAMPLE 2

An experimental earth surface was prepared by spreading sand to a depth of approximately 20 mm over an area of approximately 1 square meter. The area was divided into three sections after spreading and compacting the sand.

Area "A" was sprayed with 200 g of silicone emulsion A (described below) diluted with 200 g of water.

An anionically stabilized emulsion polymerized polydimethylsiloxane was prepared, following the procedure of Example 1, containing about 58 percent by weight of hydroxyl endblocked polydimethylsiloxane having a weight average molecular weight of about 325,000. This aqueous emulsion was anionically stabilized with the sodium salt of dodecylbenzenesulfonic acid present in an amount of about one percent based on the weight of the emulsion. The silicone emulsion was prepared by mixing 100 parts by weight of an aqueous sodium stabilized colloidal silica dispersion, having about 15 percent by weight silica, with 2 parts by weight diethylamine. Then 167 parts by weight of the above emulsion of polydimethylsiloxane was added. Next, 0.3 part by weight of an antifoam emulsion and 1 part by weight of a 50 percent by weight dioctyltindilaurate emulsion (Tin Emulsion A) were mixed in until uniform. Then 10 parts by weight of an acrylic thickening agent was mixed in until a uniform mixture resulted. This silicone emulsion (Emulsion A) had a viscosity of about 25 Pa.s at 23° C., a pH of about 11, and a solids content of about 40 percent by weight. The diluted silicone emulsion was sprayed on the sand surface from a polyethylene squeeze bottle.

Area "B" was sprayed with water from a squeeze bottle, using sufficient water to wet down the sand.

Area "C" was not treated.

The entire surface of all these sections of sand was then immediately coated by spraying with silicone emulsion B (described below) to a wet thickness of about 1.8 mm while the sand was still wet from the above treatments. Silicone emulsion B was a mixture, prepared as above described for silicone emulsion A, of 167 parts by weight of the emulsion of polydimethylsiloxane, 30 parts by weight of an aqueous sodium stabilized colloidal silica dispersion having about 50 percent by weight silica, 2 parts by weight of diethyl amine, 25 parts by weight of calcium carbonate, 0.1 part by weight of Tin Emulsion A, 5 parts by weight of thickener, 0.2 part by weight of antifoam, and 1.8 parts by weight of carbon black pigment. Emulsion B had a solids content of about 60 percent by weight, a viscosity of about 100 Pa.s, and a pH of about 11.

The coated sand sections were then allowed to dry and cure for 3 days. All the sections had large cracks in the surface. Section B had the fewest cracks, with section A next, and section C having the most cracks.

EXAMPLE 3

An experimental earth surface was prepared as in Example 2. One half of the area was sprayed with 100 g of emulsion A diluted with 300 g of water. This was left to cure overnight.

The entire area was then sprayed with a coating of emulsion B as in Example 2. After drying and curing overnight, the half treated with the diluted emulsion A had no cracks. The half that was not treated had 2 long, wide cracks through the surface.

EXAMPLE 4

A silicone emulsion was prepared by mixing 59.9 kg of an aqueous sodium stabilized colloidal silica dispersion having about 15 percent by weight silica with 1.2 kg of diethylamine, mix A. In another container, 100 kg of the anionically stabilized emulsion of polydimethylsiloxane described in Example 2, 0.6 kg of Tin Emulsion A, 0.18 kg of antifoam, and 5.4 kg of acrylic thickening agent were mixed, mix B. After mix B was uniform, 19.5 kg of a titanium dioxide pigment was added and mixed in, then mix A was added and mixed. The resulting thixotropic emulsion C had a solids content of 40.5 percent by weight and a viscosity of 24 Pa.s at 23° C.

An experimental earth surface was prepared as in Example 2. Area A was sprayed with 100 g of emulsion B diluted with 300 g of water, and dried and cured overnight. Area B was sprayed with water until the surface was uniformly wet. Area C was left dry. The entire area was then sprayed with the silicone emulsion C described above while area B was still wet. The emulsion C was then allowed to thoroughly dry.

Area A exhibited no cracks. The cured emulsion layer on top of the sand surface was about 0.7 mm thick. Area B had no cracks. While drying, the wet coating had soaked into the sand somewhat. The cured emulsion layer on top of the sand was about 0.2 mm thick. Area C was cracked due to shrinkage of the emulsion during drying and curing.

Based upon the reults of the above described examples, a preferred method of constructing a means suitable for collecting and directing water would be described as follows:

A catchment and transporting duct is formed in the earth surface such that water will flow across the surface of the catchment into and through the transporting duct. The shaped surface is covered with a layer of soil and the soil is compacted to yield a smooth, uniform surface. The catchment and duct perimeters are formed of mounds of earth (dikes) being shaped to provide an area suitable for the edge of the membrane to be produced. The edge of the membrane needs to be protected from water being able to run under it, so the membrane is formed over the dike so that the edge of the membrane is located on the back, down-sloping surface of the dike.

Emulsion A of Example 2 is diluted in a ratio of 1 part of emulsion to 3 parts of water. The diluted emulsion is sprayed over all of the surface of the catchment, transporting duct, and surrounding dikes, ending the spraying on the back-sloping sides of the dikes. The sprayed coating is then allowed to dry. The cured coating has bound the particles of soil together.

The bound surface is then sprayed with emulsion B of Example 2 to a wet thickness of about 1 mm. This coating is dried to yield a membrane impervious to liquid water.

The exposed edges of the membrane on the back, down-sloping sides of the dikes are covered with soil to hold them in place.

EXAMPLE 5

A transporting duct was prepared by first clearing a ditch of all vegetation. The surface was then smoothed and well compacted.

An anionically stabilized emulsion polymerized polydimethylsiloxane was prepared containing about 58 percent by weight of hydroxyl endblocked polydimethylsiloxane having a weight average molecular weight of about 325,000. This aqueous emulsion was anionically stabilized with the sodium salt of dodecylbenzene sulfonic acid present in an amount of about 1 percent based on the weight of the emulsion.

A silicone emulsion, D, was prepared by first mixing 6.3 parts by weight of a sodium stabilized colloidal silica dispersion having 15 percent by weight silica with 0.7 part by weight of diethylamine. Then 63.6 parts by weight of the above emulsion of polydimethylsiloxane was mixed in. Next 0.2 part by weight of silicone antifoam, 0.2 part by weight of propylene glycol, 0.9 part by weight of carbon black pigment, and 0.4 part by weight of a 50 percent by weight dioctyltindilaurate emulsion were mixed in until uniform. Then 27.7 parts by weight of kaolin clay filler was mixed in. The emulsion had a viscosity of 60 Pa.s at 23° C. and a solids content of 67 percent by weight. The pH of the emulsion was 11.5.

The surface of the transporting duct was simultaneously sprayed with the emulsion D and chopped glass fibers. The glass fibers were chopped from roving using a commercial glass fiber chopper. As the chopped fiber, in 2.5 cm lengths, sprayed from the chopper, the fiber was directed to the duct surface. At the same time, the emulsion was sprayed from a commercial airless spray gun. The fibers were wetted by the emulsion and incorporated into the coating so that there was about 5 to 10 percent by volume of glass fiber present in the wet coating. The coating was applied until a wet thickness of about 2.5 mm was achieved. There was no problem with the thixotropic coating flowing on the slanted sides of the transporting duct. The coating dried to a relatively smooth coating with the fibers distributed throughout the finished thickness of about 1.7 mm.

The transporting duct, lined with the glass fiber reinforced membrane, transported water much more efficiently than when unlined. The membrane has withstood the effects of weathering and is expected to have a long useful life.

That which is claimed is:

1. A method of constructing a means suitable for directing, transporting, or holding water comprising
   (A) treating the surface soil of the earthen depression by spraying the surface with a first aqueous liquid silicone elastomeric emulsion curable at atmospheric conditions having a solids content of from about 10 percent ot about 20 percent by weight, thereafter,
   (B) spraying the surface with a second aqueous liquid elastomeric emulsion curable at atmospheric conditions comprising
      (a) 100 parts by weight of an anionically stabilized, hydroxyl endblocked polydiorganosiloxane present as an oil-in-water emulsion,
      (b) from 1 to 150 parts by weight of colloidal silica,
      (c) from 0 to 200 parts by weight of filler other than colloidal silica, and
      (d) from 0.1 to 2.0 parts by weight of alkyl tin salt, said emulsion having a pH of from 9 to 11.5, the solids content of the emulsion being greater than 25 percent by weight based on the total weight of the emulsion, and simultaneously spraying chopped glass fibers into the emulsion at a rate sufficient to incorporate from 5 to 10 percent by volume of glass fibers based on wet emulsion coating;
   (C) allowing the emulsion coating to cure a reinforced membrane imprevious to liquid water; then
   (D) stabilizing the membrane edges by burying.

2. The method of claim 1 in which the depression in (A) is a catchment suitable for collecting water.

3. The method of claim 1 in which the depression in (A) is a transporting duct suitable for transporting water to a predetermined destination.

4. The method of claim 1 in which the depression in (A) is a water holding area.

5. The method of claim 2 in which the depression in (A) comprises a catchment and a transporting duct serving as an outlet for the catchment.

6. The method of claim 5 in which the depression in (A) comprises a catchment, transporting duct, and a water holding area which serves as a reservoir for water from the transporting duct.

7. The method of claim 2 in which the depression in (A) comprises the catchment and a water holding area which serves as a reservoir for water from the catchment.

8. The method of claim 3 in which the depression in (A) comprises the transporting duct and a water holding area which serves as a reservoir for water from the transporting duct.

* * * * *